(12) United States Patent
Hattori et al.

(10) Patent No.: US 9,287,746 B2
(45) Date of Patent: Mar. 15, 2016

(54) THREE-PHASE ALTERNATING CURRENT MOTOR

(75) Inventors: Makoto Hattori, Tokyo (JP); Shinichi Isobe, Tokyo (JP); Mikito Sasaki, Tokyo (JP)

(73) Assignee: MITSUBISHI INDUSTRIES AUTOMOTIVE THERMAL SYSTEMS CO., LTD., Kiyosu-shi (JP)

( * ) Notice: Subject to any disclaimer, the term of this patent is extended or adjusted under 35 U.S.C. 154(b) by 358 days.

(21) Appl. No.: 14/005,139

(22) PCT Filed: May 15, 2012

(86) PCT No.: PCT/JP2012/062427
§ 371 (c)(1),
(2), (4) Date: Sep. 13, 2013

(87) PCT Pub. No.: WO2013/024609
PCT Pub. Date: Feb. 21, 2013

(65) Prior Publication Data
US 2014/0001898 A1   Jan. 2, 2014

(30) Foreign Application Priority Data

Aug. 17, 2011  (JP) .................................. 2011-178424

(51) Int. Cl.
*H02K 23/40* (2006.01)
*H02K 3/28* (2006.01)
*H02K 3/52* (2006.01)

(52) U.S. Cl.
CPC . *H02K 3/28* (2013.01); *H02K 3/522* (2013.01)

(58) Field of Classification Search
CPC .... H02K 3/522; H02K 3/325; H02K 2203/12

USPC .................................... 310/71, 179, 194, 195
See application file for complete search history.

(56) References Cited

U.S. PATENT DOCUMENTS 7,650,682 B2 * 1/2010 Sugishima et al. ............. 29/596
2002/0084713 A1 7/2002 Kuroyanagi
(Continued)

FOREIGN PATENT DOCUMENTS

| CN | 100442640 C | 12/2008 |
|----|-------------|---------|
| JP | 11-136885 A | 5/1999 |
| JP | 2002-044896 A | 2/2002 |

(Continued)

OTHER PUBLICATIONS

Office Action dated May 6, 2015, issued in counterpart Chinese Patent Application No. 201280013093.0 w/English translation (15 pages).

(Continued)

*Primary Examiner* — Hanh Nguyen
(74) *Attorney, Agent, or Firm* — Westerman, Hattori, Daniels & Adrian, LLP (57) ABSTRACT

When stator winding wires of respective phases are concentratedly wound on a plurality of tooth portions provided on a stator iron core via insulating bobbins the stator winding wires of the respective phases are wound in winding spaces in slot sides so that winding heights become gradually higher toward outside diameter sides from inside diameter sides of the insulating bobbins, and in spaces formed by the stator winding wires, at the radial insides of the insulating bobbins, at outsides in an axial direction relative to the stator winding wires, connecting wires of the stator winding wires of the respective phases and a neutral point at which distal ends thereof are star-connected are placed along the spaces.

7 Claims, 6 Drawing Sheets

(56) References Cited

U.S. PATENT DOCUMENTS

2004/0263015 A1* 12/2004 Okada et al. .................. 310/194
2012/0104893 A1* 5/2012 Kitaori et al. ................. 310/195

FOREIGN PATENT DOCUMENTS

| JP | 2002-199644 A | 7/2002 |
| JP | 4149171 B2 | 9/2008 |
| JP | 2010-045952 A | 2/2010 |
| WO | 00/48292 A1 | 8/2000 |

OTHER PUBLICATIONS

Decision to Grant a Patent dated May 19, 2015, issued in counterpart Japanese Patent Application No. 2011-178424 (3 pages). Explanation of Relevance—"The Decision to Grant a Patent has been received.".
International Search Report for PCT/JP2012/062427, Mailing Date of Aug. 14, 2012.
Written Opinion for PCT/JP2012/062427, Mailing Date of Aug. 14, 2012.

* cited by examiner

THREE-PHASE ALTERNATING CURRENT MOTOR

TECHNICAL FIELD

The present invention relates to a three-phase AC (alternating current) motor suitable for being applied as a motor that drives an electric compressor of a vehicle air conditioner, or the like.

BACKGROUND ART

In a vehicle air conditioner that is mounted on an electric vehicle, a hybrid vehicle, or the like, an electric compressor with an inverter integrally installed in the compressor is used. In such electric compressors, a three phase AC motor to which three-phase alternating current power converted via an inverter is applied is used as the motor for driving the compressor. Such an inverter-integrated electric compressor is required to be miniaturized as much as possible for being mounted in the inside of an engine room, and accordingly the motor is also eagerly required to be miniaturized.

As the above described three-phase AC motor, a concentrated wound (also called series wound) motor is used, and in the stator thereof, the connecting wires of stator winding wires of respective phases U, V and W that are wound on the tooth portions of a stator iron core via insulating bobbins and the neutral point at which the distal ends of the winding wires are star-connected are typically arranged outside the bobbins. Therefore, the outer shape of the stator itself tends to be large, which is not sufficiently compatible with the need for miniaturization of the motor.

Meanwhile, PTL 1 discloses an electric motor constituted of a main wire-wound body in which a main winding wire is continuously wound in series on a plurality of split iron cores via connecting wires by concentrated winding, and an auxiliary wire-wound body in which an auxiliary winding wire is continuously wound in series on a plurality of split iron cores via connecting wires by concentrated wiring. In the electric motor, extended portions are formed by extending the top portions of the inner walls of the respective insulating bobbins in a circumferential direction, and the connecting wires of the main winding wire or the auxiliary winding wire are disposed so as to be laid on outer circumferential sides of the extended portions.

CITATION LIST

Patent Literature

{PTL 1}
The Publication of Japanese Patent No. 4149171

SUMMARY OF INVENTION

Technical Problem

As described above, in the three-phase AC motor in which the connecting wires of the stator winding wires of the respective phase of U, V and N phases and the neutral point at which the distal ends thereof are star-connected are placed outside the insulating bobbins, the stator itself cannot be sufficiently miniaturized. Accordingly, the needs for miniaturizing the motor itself and reducing cost cannot be satisfied. In particular, in the motor that adopts a single star type series winding structure in order to simplify the configuration of the stator winding wires and reduce the cost, the total connecting wire length becomes large as compared with a motor that adopts a multiple-star type winding method, such as three star type, and therefore, handling with the large total length thereof remains to be improved.

In contrast, in the motor shown in PTL 1, the extended portions are formed by extending the top portions of the inner walls of the insulating bobbins in the circumferential direction, and the connecting wires of the main winding wires or the auxiliary winding wires are placed by being laid on the outer circumferential sides of the extended portions. However, the motor does not include a neutral point at which the distal ends of the respective stator winding wires are star-connected. Accordingly, PTL 1 suggests nothing about how the neutral point is placed and housed, and does not sufficiently satisfy the needs for miniaturization and cost reduction of the electric motor.

The present invention is made in light of the circumstances described above, and has an object to provide a three-phase AC motor capable of miniaturizing a stator, and a motor as a result, and reducing cost thereof by securing spaces at inner diameter sides of insulating bobbins, and placing a plurality of connecting wires of stator winding wires of respective phases U, V and W and a neutral point at which distal ends of the winding wires are star-connected in the spaces.

Solution to Problem

In order to solve the above described problem, the three-phase AC motor of the present invention adopts the following means.

More specifically, the three-phase AC motor according to the present invention is a three-phase AC motor including a stator in which a plurality of tooth portions are provided at an inner circumferential side of a stator iron core, and stator winding wires of U, V and W phases are concentratedly wound respectively on each of the tooth portions via an insulating bobbin, wherein a plurality of slots each of which is formed between the tooth portions are configured so that winding spaces are formed to be gradually wider toward an outside diameter side, wherein in the winding spaces, the stator winding wires of the respective phases are wound so that winding heights become gradually higher toward outside diameter sides from inside diameter sides of the insulating bobbins, and wherein in spaces that are formed by the wound stator winding wires at the inside diameter sides of the insulating bobbins and at an outer side in an axial direction relative to the wound stator winding wires, connecting wires of the stator winding wires of the respective phases and a neutral point at which distal ends of the winding wires are star-connected are placed along the spaces.

According to the present invention, when the stator winding wires of the U, V and W phases are concentratedly wound on a plurality of tooth portions provided on the stator iron core via the insulating bobbins, the stator winding wires are wound in the winding spaces in the slot sides so that the winding heights become gradually higher toward the outside diameter sides from the inside diameter sides of the insulating bobbins. In the spaces that are formed by the stator winding wires at the inside diameter sides of the insulating bobbins and at the outsides in the axial directions relative to the stator winding wires, the connecting wires of the stator winding wires of the respective phases and the neutral point at which the distal ends the wires are star-connected are placed along the spaces. Consequently, the connecting wires of the stator winding wires of the respective phases U, V and W, and the neutral point at which the distal ends of the wires are star-connected can be placed in the spaces that are formed at the inside diameter sides of the insulating bobbins and at the outsides in the axial direction relative to she stator winding wires, by winding the stator winding wires of the respective phases in the winding spaces in the slot sides so that the winding heights become gradually higher toward the outside diameter sides from the inside diameter sides of the insulating bobbins. Accordingly, plurality of connecting wires and the neutral point at which star connection is made can be placed by securing the spaces at the inside diameter sides of the insulating bobbins, and as compared with the concentrated-wound motor in which the connecting wires and the neutral point are disposed outside the insulating bobbins, miniaturization and cost reduction of the stator as a whole, and of the motor using the stator can be achieved. In particular, the motor is applied to the driving motor for an on-vehicle air conditioner, and thereby mountability thereof can be enhanced.

In the above described three-phase AC motor, the stator winding wires of the respective phases preferably have a single star type series winding structure.

According to the present invention, since the stator winding wires of the respective phases have a single star type series winding structure, as compared with, for example, three-star type winding method, the configuration is simplified by reducing the number of neutral points at which star connection is made to one from three, and the cost can be reduced. Meanwhile, by adopting a single star type series winding structure, the total length of the connecting wires become large, but the connecting wires and the like are placed in the spaces that are formed at the radial insides of the insulating bobbins, and thereby, can be handled without any special problem. Accordingly, in the technical field of concentrated-wound motor, miniaturization can be achieved while cost is reduced.

In any one of the aforementioned three-phase AC motors, the neutral point has a welded structure, and a welded portion thereof is covered with a protection cover and placed in the space formed at a radial inside of the insulating bobbin.

According to the present invention, the neutral point has a welded structure, and the welded portion is covered with the protection cover and is placed in the space at the radial inside of the insulating bobbin. The neutral point having the welded structure is covered with the protection cover, whereby the neutral point can be placed in the apace at the radial inside of the insulating bobbin while, the stator winding wires of the respective, phases U, V and W that are wound on the insulating bobbins are protected. Accordingly, there is no fear that the stator winding wires of the respective phases are damaged by the neutral point having the welded structure, and the neutral point can be placed safely in the space at the radial inside of the insulating bobbin.

In any one of the aforementioned three-phase AC motors, the neutral point at which the stator winding wires of the respective phases are star-connected is placed in the space at a radial inside of the insulating bobbin, and the neutral point is placed in a region in which the connecting wires of the stator winding wires of the respective phases are not placed or a region in a number of connecting wires placed therein is small.

According to the present invention, the neutral point at which the stator winding wires of the respective phases are star-connected is placed in the space at the radial inside of the insulating bobbin, and the neutral point is placed in the region in which the connecting wires of the stator winding wires of the respective phases are not placed, or the region in which the number of the connecting wires placed therein is small. Therefore, a number of the connecting wires of the stator winding wires of the respective phases and the neutral point at which star-connection thereof is made are not housed in the space at the inside diameter side of the insulating bobbin by being overlaid on one another many times. Accordingly, with respect to the spaces that are formed at the radial insides of the insulating bobbins, a plurality of connecting wires of the stator winding wires of the respective phases and the neutral point at which star-connection is made can be sufficiently placed and housed.

In any one of the aforementioned three-phase AC motors, the insulating bobbin is provided with a stopper at an end portion in the axial direction of a flange portion of the insulating bobbin which is provided at the inside diameter side of the insulating bobbin so that the stopper protrudes toward a radial outside.

According to the present invention, the stopper that is protruded toward the radial outside is provided at the end portion in the axial direction of the flange portion at the inside diameter side of the insulating bobbin. Therefore, the connecting wires of the stator winding wires of the respective phases and the neutral point at which star connection is made that are placed in the spaces at the radial insides of the insulating bobbins can be locked into the spaces at the radial insides of the insulating bobbins by the stoppers. Accordingly, the connecting wires of the stator winding wires of the respective phases and the neutral point at which star connection is made can be reliably placed so as not to get displaced in the axial direction from the insides of the spaces formed at the radial insides of the insulating bobbins.

In any one of the aforementioned three-phase AC motors, the insulating bobbin is provided with an openable, and closable lid portion at an end portion in the axial direction of a flange portion of the insulating bobbin which is provided at the outside diameter side of the insulating bobbin, for closing the end portion of the bobbin.

According to the present invention, the openable and closable lid portion that closes the end portion in the axial direction of the bobbin is provided at the end portion in the axial direction of the flange portion at the outside diameter side of the insulating bobbin. Therefore, after the stator winding wires of the respective phases are wound on the tooth portions via the insulating bobbins, and the connecting wires thereof and the neutral point at which star connection is made are placed in the spaces at the radial insides of the insulating bobbins, the end portions in the axial direction of the insulating bobbins can be closed by the openable and closable lid portions provided at the flange portions at the outside diameter side. Accordingly, the connecting wires of the stator winding wires of the respective phases and the neutral point at which star connection is made can be placed so as not to get displaced in the axial direction from the insides of the spaces at the radial insides of the insulating bobbins. Further, the stator winding wires of the respective phases, the connecting wires thereof, the neutral point at which star connection is made and the like can be protected by the lid portions.

In any one of the aforementioned three-phase AC motors, a detachable cap is preferably provided at an end portion in an axial direction of the insulating bobbin.

According to the present invention, the detachable cap is provided at she end portion in the axial direction of the insulating bobbin. Therefore, after the stator winding wires of the respective phases are wound on the tooth portions via the insulating bobbins, and the connecting wires thereof and the neutral point at which star connection is made are placed in the spaces at the radial insides of the insulating bobbins, the caps are fitted onto the end portions in the axial direction of the insulating bobbins, and thereby the end portions in the axial direction of the insulating bobbins can be closed with the caps. Accordingly, the connecting wires of the stator winding wires of the respective phases and the neutral point at which star connection is made can be placed so as not to get displaced in the axial direction from the insides of the spaces at the radial insides of the insulating bobbins. Further, to stator winding wires of the respective phases, the connecting wires thereof, the neutral point at which star connection is made and the like can be protected by the caps.

Advantageous Effects of Invention

According to the present invention, the connecting wires of the stator winding wires of the respective phases U, V and W, and the neutral point at which the distal ends of the wires are star-connected can be placed in the spaces that are formed at the radial insides of the insulating bobbins, at the outside in the axial direction relative to the stator winding wires, by winding the stator winding wires of the respective phases in the winding spaces in the slot sides so that the winding heights become gradually higher toward the outside diameter sides from the inside diameter sides of the insulating bobbins. Accordingly, a plurality of connecting wires and the neutral point at which star connection is made can be placed by securing the spaces at the radial insides of the insulating bobbins, and as compared with the concentrated-wound motor in which the connecting wires and the neutral point are disposed outside the insulating bobbins, miniaturization and cost reduction of the stator as a whole, and of the motor using the stator can be achieved. In particular, when the motor is applied to the driving motor for an on-vehicle air conditioner, mountability thereof can be enhanced.

DESCRIPTION OF EMBODIMENTS

Hereinafter, embodiments according to the present invention will be described with reference to the drawings.

First Embodiment

Hereinafter, a first embodiment of the present invention will be described with reference to FIGS. 1 to 8.

Figure 1:
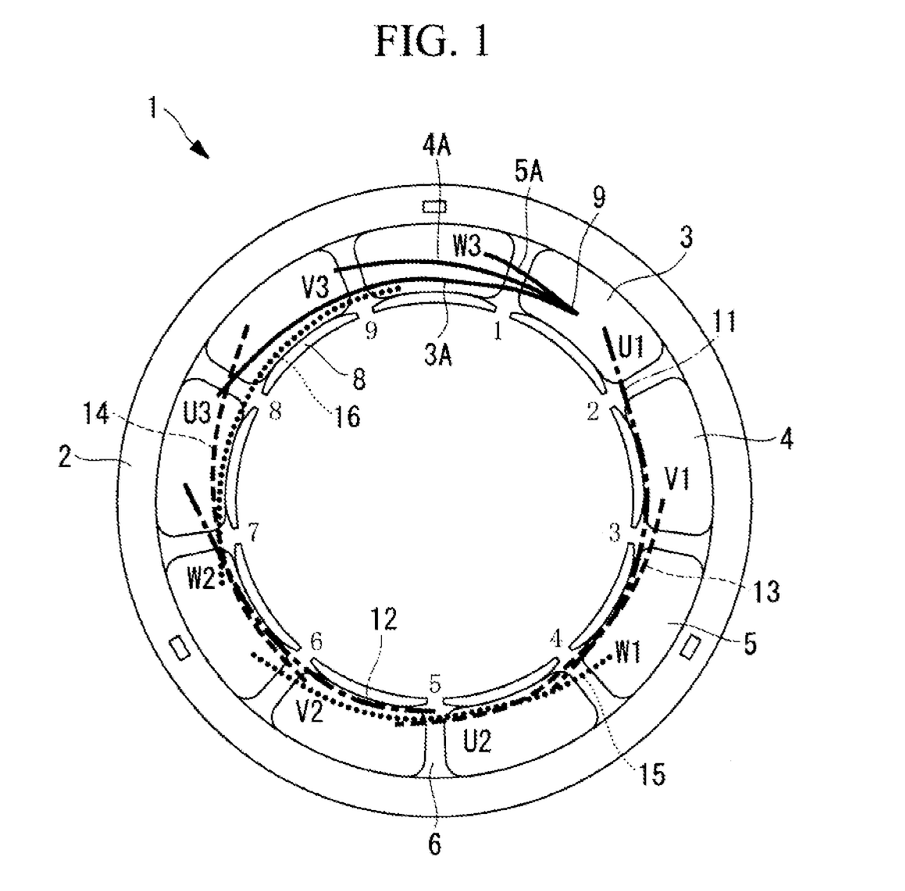
FIG. 1 is a plan view of a stator of a three-phase AC motor according to a first embodiment of the present invention.
Figure 2:
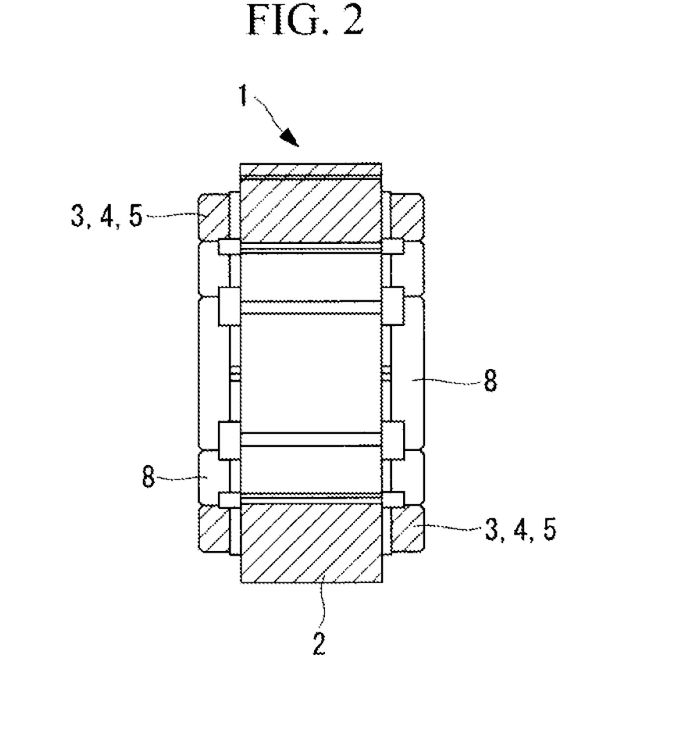
FIG. 2 shows a view corresponding to a vertical section of the stator shown in FIG. 1.
Figure 3:
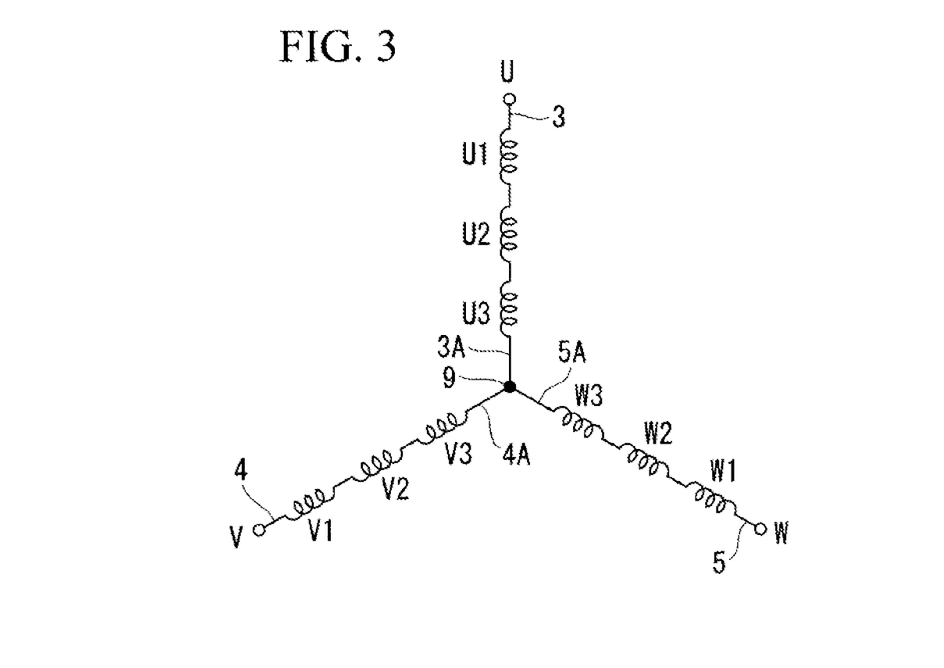
FIG. 3 is a schematic diagram of a state of wire connection of stator winding wires of respective phases of the stator shown in FIG. 1.

FIG. 1 shows a plan view of a stator of a three-phase AC motor according to the first embodiment of the present invention. FIG. 2 shows a view corresponding to a vertical section thereof. FIG. 3 shows a schematic diagram of a state of wire connecting of stator winding wires of respective phases thereof.

A stator 1 is configured by winding stator winding wires 3, 4 and 5 of respective phases U, V and W on a stator iron core 2 formed in a cylindrical shape.

Figure 4:
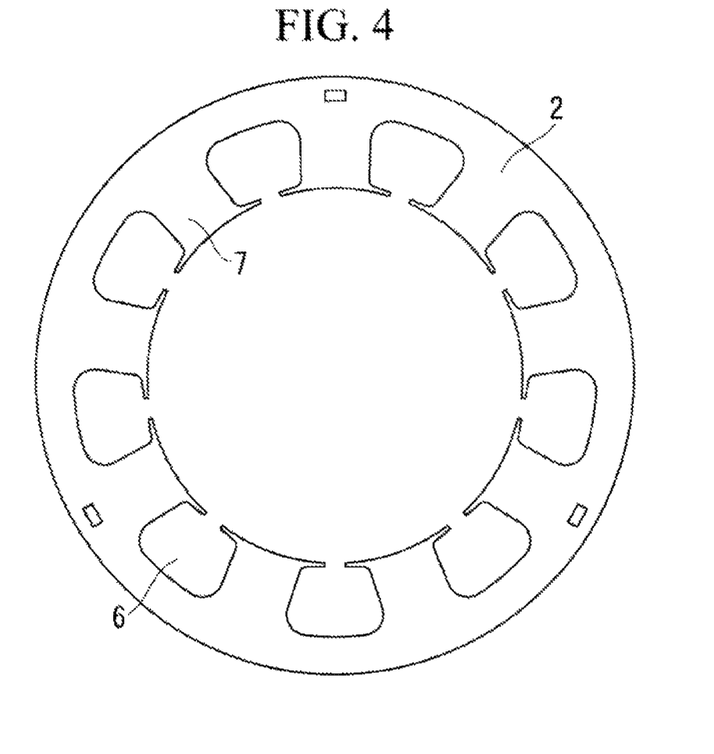
FIG. 4 is a plan view of a stator iron core of the stator shown in FIG. 1.

The stator iron core 2 is configured by laminating a predetermined number of ring-shaped plate materials shaped by punching an electromagnetic steel plate or the like into predetermined shapes, and integrally bonding the plate materials by caulking, welding or the like. As shown in FIG. 4, on an inner circumferential surface side of the stator iron core 2, slots 6 to be winding spaces are provided at a plurality of spots (nine spots assigned with numbers 1 to 9 in the present embodiment) equidistantly in a circumferential direction, and tooth portions 7 are formed at nine spots respectively between the slots 6.

Figure 6:
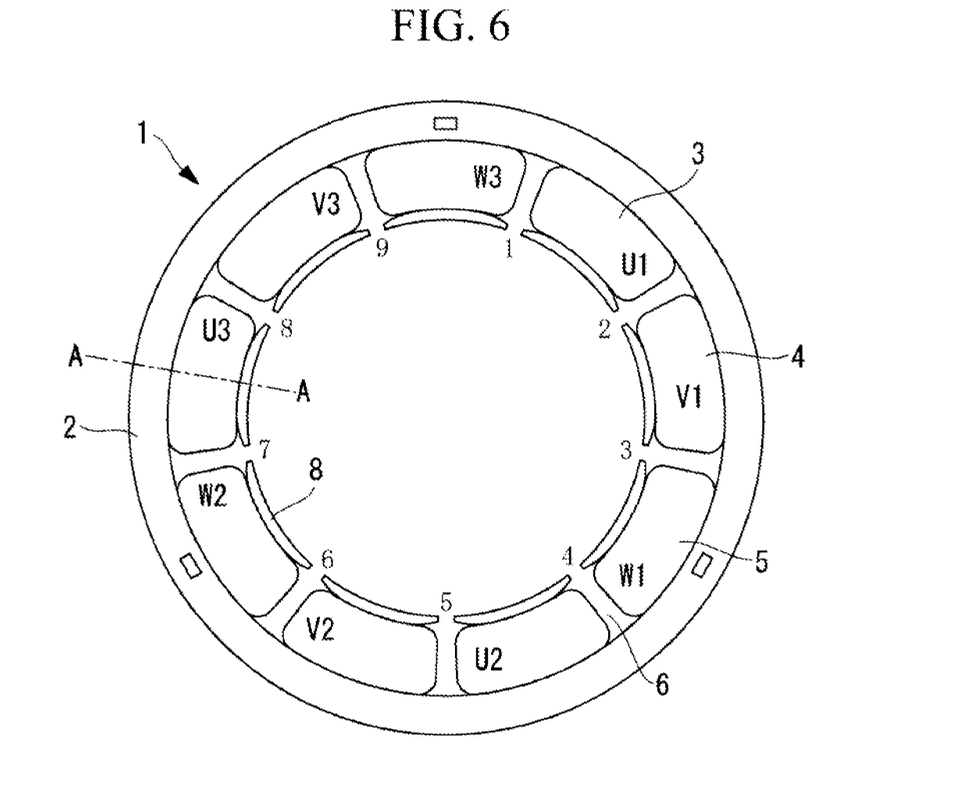
FIG. 6 is a plan view showing a state in which the stator winding wires of respective phases are wound on the stator iron core shown in FIG. 4 via insulating bobbins.

As shown in FIGS. 1 and 6, on the tooth portions 7 at the nine spots of the stator iron core 2, the stator winding wires 3, 4 and 5 of the respective phases U, V and W are wound respectively via insulating bobbins 8. These stator winding wires 3, 4 and 5 are concentratedly wound (also called series-wound) on the tooth portions 7 at the nine spots so as to form coils U1, V1 and W1, coils U2, V2 and W2 and coils U3, V3 and W3 alternately. With respect to the stator winding wires 3, 4 and 5 and the respective coils U1 to W3, the distal ends are star-connected at a neutral point 9 to have a single star type series winding structure as shown in FIG. 3.

Figure 5:
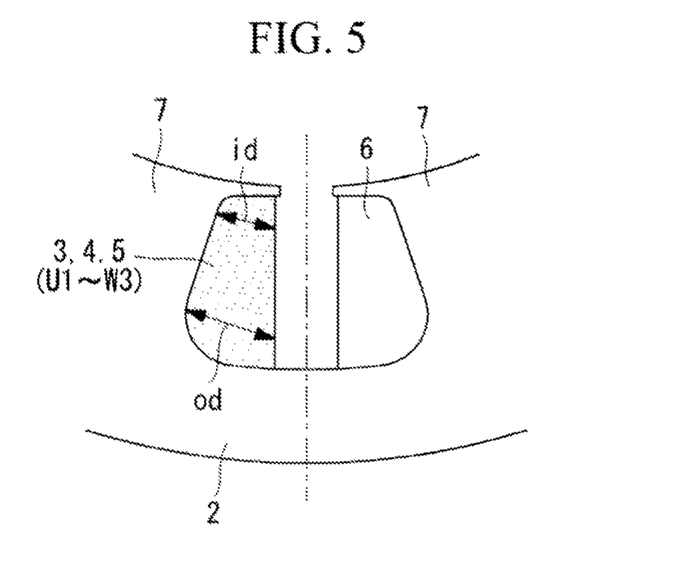
FIG. 5 is an enlarged view of a slot portion of the stator iron core shown in FIG. 4.
Figure 7:
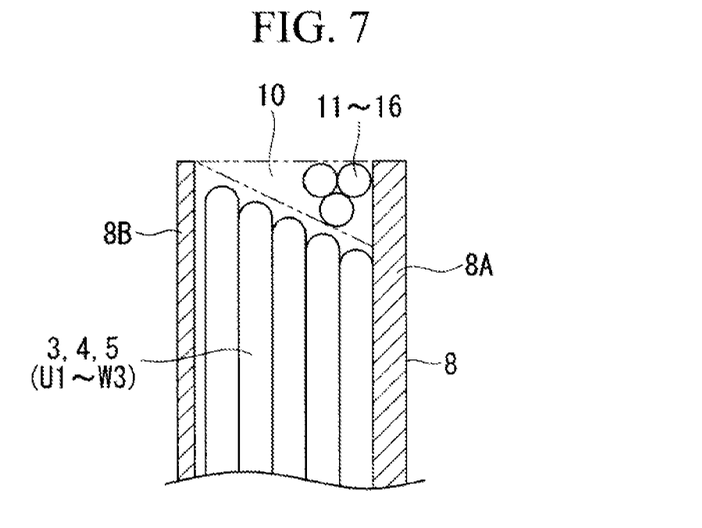
FIG. 7 shows a view corresponding to an A-A section in FIG. 6.

The respective coils U1 to W3 of the stator winding wires 3, 4 and 5 of the respective phases use the slots 6 provided in the stator iron core 2 as winding spaces for forming the coil U1 to W3 by concentratedly winding the stator winding wires 3, 4 and 5 of the respective, phases on the tooth portions 7, and are wound on each of the tooth portions 7 so that the numbers of windings of the wires are larger at an outside diameter (od) side as compared with an inside diameter (id) side, as shown in FIG. 5. Thereby, the stator winding wires 3, 4 and 5 of the respective phases are wound on the insulating bobbins 8 so that winding heights become gradually higher from the inside diameter side toward the outside diameter side, as shown in FIG. 7. As a result, at an outer side in an axial direction in the insulating bobbin 8, a space 10 in a shape of a right triangle with a ridge line as the longest line of the triangle which is formed by the winding height being made gradually higher is formed between a radial inside flange portion 8A and a radial outside flange portion 8B thereof.

In the present embodiment, the triangular spaces 10 that are formed in the radial insides of the insulating bobbins 8 by aforementioned winding of the stator winding wires 3, 4 and 5 of the respective phases are used as spaces in which connecting wires 11, 12, 13, 14, 15 and 16 that respectively connect the respective coils U1, U2 and U3, the coils V1, V2 and V3, and the coils W1, W2 and W3 of the stator winding wires 3, 4 and 5 of the respective phases are placed and housed as shown in FIG. 1.

Namely, one, two or three of the connecting wires including the connecting wires 11 and 12 that connect the respective coils U1 and U2, and U2 and U3, the connecting wires 13 and 14 that connect the coils V1 and V2, and V2 and V3, and the connecting wires 15 and 16 that connect the coils W1 and W2, and W2 and W3 are placed and housed in the spaces 10 at the radial insides of the respective insulating bobbins 3, as shown in FIG. 1. Thereby, the respective coils U1 to W3 are concentratedly wound sequentially or the plurality of tooth portions 7.

Further, similarly, in the spaces 10 formed at the radial insides of the respective insulating bobbins 8, in the space 10 of each of the insulating bobbins 8 on which the coils V3, W3 and U1 are wound, that is a region where the above described connecting wires 11 to 16 are not placed, or a region where to number of the connecting wires 11 to 16 placed therein is as small as one, the neutral point 9 at which the distal ends of the stator winding wires 3, 4 and 5 of the respective phases are star-connected is placed and housed.

Figure 8:
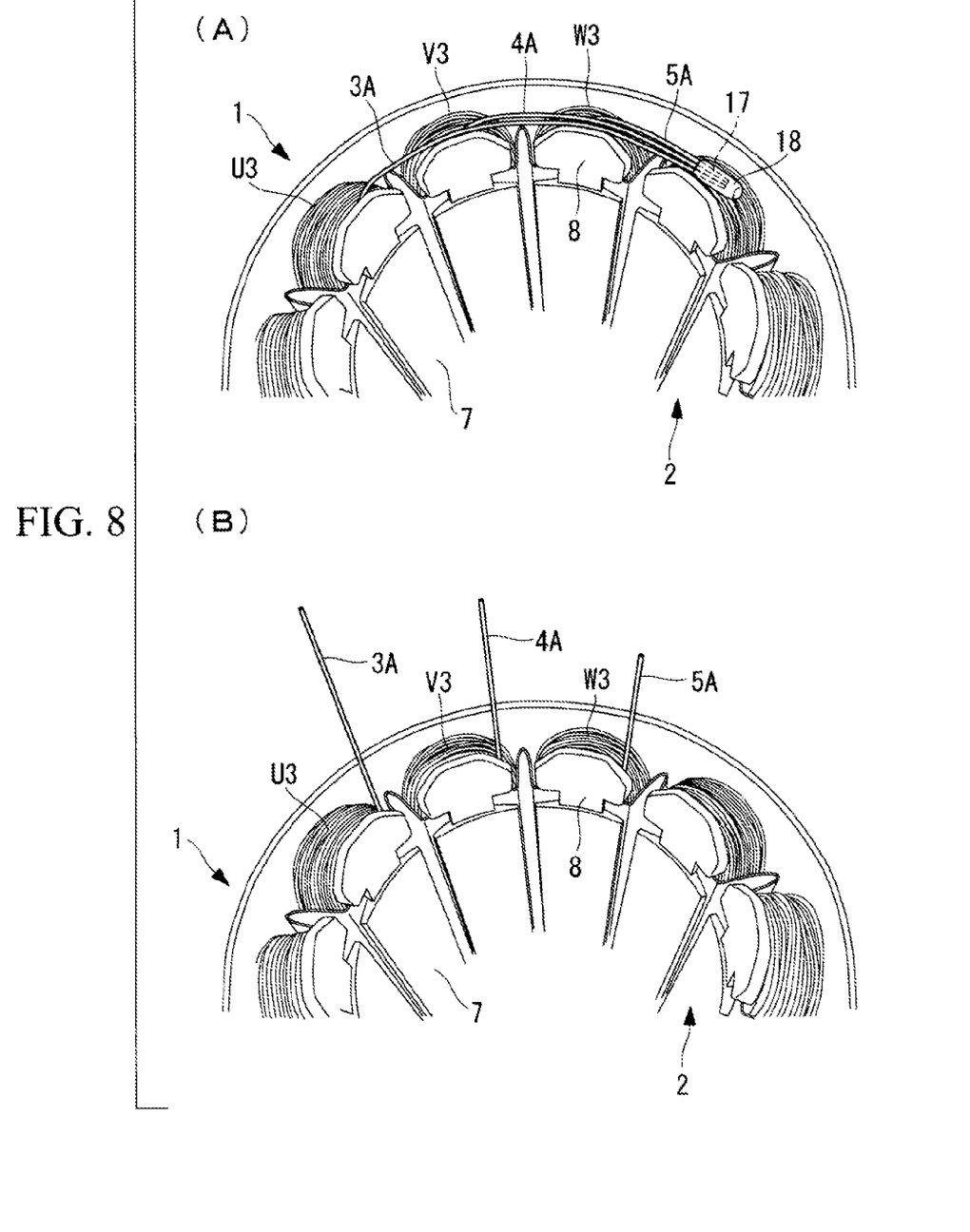
FIG. 8 are perspective views showing a state (A) in which a neutral point at which distal ends of the stator winding wires of the respective phases shown in FIG. 3 are star-connected is welded, folded, and placed to be housed, and a state (B) before welding.

The neutral point 9 is formed by winding the stator winding wires 3, 4 and 5 of the respective phases on the tooth portions 7 to form the coils U3, V3 and W3, and connecting the stator winding wires at distal ends 3A, 4A and 5A of the stator winding wires 3, 4 and 5 that are led out from winding end portions thereof by means of bounding and folding the wires and welding the distal end portions to one another at a welded portion 17 as shown in FIGS. 8(A) and 8(B). The neutral point 9 is placed and housed along the space 10 which is formed at the radial inside of the insulating bobbin 8 and which the connecting wires 11 to 16 are not placed in or the number of the connecting wires 11 to 15 placed in is as small as one, with the welded portion 17 being covered with a cover 18, as shown in FIG. 8(A).

By the configuration described above, according to the present embodiment, a function or effect as follows is provided.

The U, V and W wires that are connected to a U, V and W terminals at an inverter side are concentratedly wound on the tooth portions 7 of the stator iron core 2 respectively via the insulating bobbins 8, at a stator 1 side of the motor so as to form the coils U1, U2 and U3, the coils V1, V2 and V3 and the coils W1, W2 and W3. At this time, the wires are wound on the tooth portions 7 so that the numbers of windings of the stator winding wires 3, 4 and 5 of the respective phases are larger at the outside diameter sides.

Thereby, the stator winding wires 3, 4 and 5 of the respective phases are wound on the insulating bobbins 8 so that the winding heights become gradually higher toward the outside diameter sides from the inside diameter sides of the insulating bobbins 3, as shown in FIG. 7, whereby the space 10 in the shape of a right triangle is formed between the radial inside flange portion 8A and the radial outside flange portion 8B of each of the insulating bobbins 8, at an outside in an axial direction. The coils U1 to W3 are wound sequentially on the tooth portions 7 while the connecting wires 11 and 12 that connect the coils U1 and U2, and U2 and U3, the connecting wires 13 and 14 that connect the coils V1 and V2, and V2 and V3, and the connecting wires 15 and 17 that connect the coils W1 and W2, and W2 and W3 are placed and housed in the spaces 10.

Subsequently, winding of the coils U3, V3 and W3 is completed, and the coating on each of the distal ends 3A, 4A and 5A of the respective stator winding wires 3, 4 and 5 that are led out from the winding end portions is removed. The distal end portions are bound into one and welded, and thereby, are star-connected at the neutral point 9. As a result, the stator winding wires become a single star type series winding structure. Further, as shown in FIG. 1, the neutral point 9 is placed and housed in the space 10 which is formed at the radial inside of the insulating bobbin 8 on which the coil V3, W3 or U1 is wound, and which the connecting wires 11 to 16 are not placed in, or the number of the connecting wires 11 to 16 placed in is small, in the state in which the welded portion 17 is covered with the cover 18, so as not to be overlaid on the connecting wires 11 to 16 as much as possible.

As above, according to the present embodiment, when the stator winding wires 3, 4 and 5 of the U, V and W phases are wound in series on a plurality of tooth portions 7 of the stator iron core 2 via the insulating bobbins 8, the stator winding wires are wound in the winding spaces in the slots 6 so that the winding heights become gradually higher toward the outside diameter sides from the inside diameter sides along the insulating bobbins 8. In the spaces 10 that are formed at the radial insides of the insulating bobbins 8 by the stator winding wires 3, 4, and 5, at the outside in the axial direction relative to the stator winding wires 3, 4 and 5, the connecting wires 11 to 16 of the stator winding wires 3, 4 and 5 of the respective phases and the neutral point 9 at which the distal ends 3A, 4A and 5A thereof are star-connected are placed and housed along the spaces 10.

Consequently, the connecting wires 11 to 16 of the stator winding wires 3, 4 and 5 of the respective phases of the U, V and W phases, and the neutral point 9 at which the distal ends 3A, 4A and 5A thereof are star-connected can be placed and housed in the spaces 10, and the spaces 10 are formed at the outsides in the axial direction relative to the stator winding wires 3, 4 and 5 and at the radial insides of the insulating bobbins 8 by winding the stator winding wires 3, 4 and 5 of the respective, phases in the winding spaces in the slot 6 so that the winding heights become gradually higher toward the outside diameter sides from the inside diameter sides of the insulating bobbins 8.

Thereby, a plurality of connecting wires 11 to 16 and the neutral point 9 at which star connection is made can be placed by securing the spaces 10 at the radial insides of the insulating bobbins 8. Therefore, as compared with the concentrated-wound motor in which the connecting wires and the neutral point are disposed outside the insulating bobbins 8, miniaturization and cost reduction of the stator 1 as a whole structure, and miniaturization and cost reduction of the concentrated-wound motor using the stator 1 as a result can be achieved. In particular, the motor is applied to the driving motor for an on-vehicle air conditioner, and thereby mountability thereof can be enhanced.

Further, since, the stator winding wires 3, 4 and 5 of the respective phases of the U, V and W phases have a single star type series winding structure, as compared with, for example, a three-star type winding method, the configuration is simplified by reducing the number of neutral points 9 where star connection is made to one instead of three, and the cost can be reduced. Meanwhile, by adopting the single star type series winding structure, the lengths of the connecting wires 11 to 16 become large, but the connecting wires 11 to 16 and the like are placed and housed in the spaces 10 that are formed at the radial insides of the insulating bobbins 8, and thereby, can be organized without any special problem. Accordingly, in the technical field of concentrated-wound motor, miniaturization can be achieved while the cost is reduced.

Furthermore, in the present embodiment, the neutral point 9 has a welded structure, and the welded portion 17 is covered with the protection cover 18 and is placed and housed in the space 10 at the radial inside of the insulating bobbin 8. Since the neutral point 9 that has the welded structure is covered with the protection cover 18, the neutral point 9 can be placed and housed in the space 10 at the radial inside of the insulating bobbin 8 while the stator winding wires 3, 4 and 5 of the respective phases of the U, V and W phases that are wound on the insulating bobbins 8 are protected. Accordingly, there is no fear that the stator winding wires 3, 4 and 5 of the respective phases are damaged by the neutral point 9 having the welded structure, and the neutral point 9 can be placed and housed safely in the space 10 at the radial inside of the insulating bobbin 8.

Further, the neutral point 9 at which the stator winding wires 3, 4 and 5 of the U, V and W phases are star-connected is placed and housed in the space 10 at the radial inside of the insulating bobbin 8, in the region in which the connecting wires 11 to 16 of the stator winding wires 3, 4 and 5 of the respective phases are not placed, or the region in which the number of the connecting wires 11 to 16 placed therein is small. Therefore, a number of the connecting wires 11 to 16 of the stator winding wires 3, 4 and 5 of the respective phases and the neutral point 9 at which star connected is made are not housed in a space 10 at the radial inside of the insulating bobbin 8 by being overlaid on one another many times. Thereby, in the spaces 10 that are formed at the radial insides of the insulating bobbins 8, a plurality of connecting wires 11 to 16 of the stator winding wires 3, 4 and 5 of the respective phases and the neutral point 9 at which star connection is made can be sufficiently placed and housed.

Second Embodiment

Next, a second embodiment of the present invention will be described with reference to FIG. 9.

The present embodiment differs from the first embodiment described above in that a stopper 19 and a lid portion 20 are provided for the flange portions of the insulating bobbin 8. The other features are similar to the first embodiment, and therefore, the descriptions for the features will be omitted.

Figure 9:
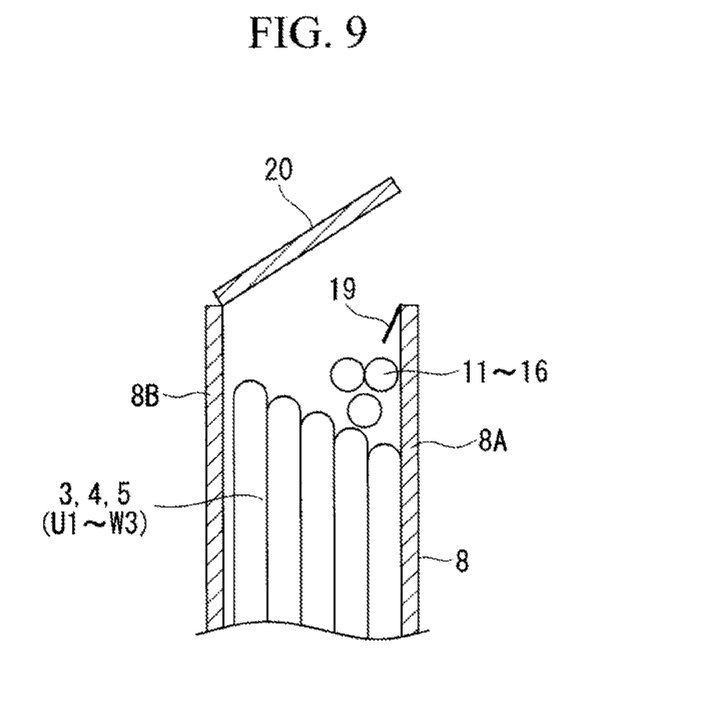
FIG. 9 shows a view corresponding to the A-A section in FIG. 6 according to a second embodiment of the present invention.

As shown in FIG. 9, the present embodiment adopts a configuration in which the stopper 19 that is protruded toward the outside diameter direction is provided at an end portion in the axial direction of the radial inside flange portion 8A of each of the insulating bobbins 8, or the openable and closable lid portion 20 for closing an end portion in the axial direction of the bobbin 8 is provided at an end portion in the axial direction of the radial outside flange portion 8B of each of the insulating bobbins 8, so that the connecting wires 11 to 16 of 3, 4 and 5 and the neutral point 9 at which star connection is made that are placed and housed in the spaces 10 at the radial insides of the insulating bobbins 8 do not get displaced in the axial direction from the radial insides of the spaces 10 at the inside diameter sides of the insulating bobbins 8.

By adopting the configuration in which the stoppers 19 and/or the lid portions 20 are provided as described above, the connecting wires 11 to 16 of the stator winding wires 3, 4 and 5 of the respective phases and the neutral point 9 at which star connection is made that are placed and housed in the spaces 10 at the radial insides of the insulating bobbins 8 can be held in the spaces 10 at the inside diameter sides of the insulating bobbins 8 by the stoppers 19 or the lid portions 20. Therefore, the connecting wires 11 to 16 of the stator winding wires 3, 4 and 5 of the respective phases and the neutral point 9 at which star connection is made can be reliably placed and housed so as not to get displaced in the axial direction from the insides of the spaces 10 at the radial insides of the insulating bobbins 8. Further, the stator winding wires 3, 4 and 5 of the respective phases, the connecting wires 11 to 15 thereof, the neutral point 9 at which star connection is made and the like can be protected by the lid portions 20.

Further, the above described embodiment adopts the configuration in which the stopper 19 or the lid portion 20 is provided at the radial inside flange portion 8A or the radial outside flange portion 8B of the insulating bobbin 8, but may adopt such a configuration that a detachable cap is provided at the end portion in the axial direction of the insulating bobbin 8 so as to cover an entire surface of each of the insulating bobbins 8 instead of the above described configuration.

By providing such caps, the connecting wires 11 to 16 of the stator winding wires 3, 4 and 5 of the respective phases and the neutral point 9 at which star connection is made also can be placed and housed with the caps so as not to get displaced in the axial direction from the insides of the spaces 10 at the radial insides of the insulating bobbins 8. Further, the caps can protect the stator winding wires 3, 4 and 5 of the respective phases, the connecting wires 11 to 16 thereof, the neutral point 9 at which the star connection is made and the like.

Note that the present invention is not limited to the invention described as the above described embodiments, and can be properly modified within the range of the invention without departing from the scope thereof. For example, in the above described embodiments, the example of adopting the winding method of the single star type series winding structure is described, but the present invention is not necessarily limited to this, and also can be applied similarly to the motor having a multiple-star type winding structure.

REFERENCE SIGNS LIST

1 STATOR
2 STATOR IRON CORE
3, 4, 5 STATOR WINDING WIRE OF RESPECTIVE PHASES (STATOR WINDING WIRES OF U, V AND W PHASES)
3A, 4A, 5A DISTAL END OF STATOR WINDING WIRE
6 SLOT
7 TOOTH PORTION
8 INSULATING BOBBIN
8A RADIAL INSIDE FLANGE PORTION
8B RADIAL OUTSIDE FLANGE PORTION
9 NEUTRAL POINT
10 SPACE
11-16 CONNECTING WIRE
17 WELDED PORTION
18 COVER
19 STOPPER
20 LID PORTION
U1, U2, U3 COIL
V1, V2, V2 COIL
W1, W2, W3 COIL

The invention claimed is:
1. A three-phase AC motor including a stator in which a plurality of tooth portions are provided at an inner circumferential side of a stator iron core, and stator winding wires of U, V and W phases are concentratedly wound respectively on each of the tooth portions via an insulating bobbin,
wherein a plurality of slots each of which is formed between the tooth portions are configured so that winding spaces are formed to be gradually wider toward an outside diameter side,
wherein in the winding spaces, the stator winding wires of the respective phases are wound so that winding heights become gradually higher toward outside diameter sides from inside diameter sides of the insulating bobbins, and
wherein in spaces that are formed by the wound stator winding wires at the inside diameter sides of the insulating bobbins and at an outer side in an axial direction relative to the wound stator winding wires, connecting wires of the stator winding wires of the respective phases and a neutral point at which distal ends of the winding wires are star-connected are placed along the spaces.

2. The three-phase AC motor according to claim 1, wherein the stator winding wires of the respective phases have a single star type series winding structure.

3. The three-phase AC motor according to claim 1, wherein the neutral point has a welded structure, and a welded portion thereof is covered with a protection cover and placed in the space formed at a radial inside of the insulating bobbin.

4. The three-phase AC motor according to claim 1, wherein the neutral point at which the stator winding wires of the respective phases are star-connected is placed in the space at a radial inside of the insulating bobbin, and the neutral point is placed in a region in which the connecting wires of the stator winding wires of the respective phases are not placed or a region in which a number of connecting wires placed therein is small.

5. The three-phase AC motor according to claim 1, wherein the insulating bobbin is provided with a stopper at an end portion in the axial direction of a flange portion of the insulating bobbin which is provided at the inside diameter side of the insulating bobbin so that the stopper protrudes toward a radial outside.

6. The three-phase AC motor according to claim 1, wherein the insulating bobbin is provided with an openable and closable lid portion at an end portion in the axial direction of a flange portion of the insulating bobbin which is provided at the outside diameter side of the insulating bobbin, for closing the end portion of the bobbin.

7. The three-phase AC motor according to claim 1, wherein a detachable cap is provided at an end portion in an axial direction of the insulating bobbin.

* * * * *